US012633507B2

(12) United States Patent
Gazis

(10) Patent No.: US 12,633,507 B2
(45) Date of Patent: May 19, 2026

(54) BAYESIAN DECREMENTAL SCHEME FOR CHARGE STATE DECONVOLUTION

(71) Applicant: THERMO FINNIGAN LLC, San Jose, CA (US)

(72) Inventor: Paul R. Gazis, Mountain View, CA (US)

(73) Assignee: Thermo Finnigan LLC, San Jose, CA (US)

( * ) Notice: Subject to any disclaimer, the term of this patent is extended or adjusted under 35 U.S.C. 154(b) by 374 days.

(21) Appl. No.: 18/337,183

(22) Filed: Jun. 19, 2023

(65) Prior Publication Data

US 2024/0038514 A1     Feb. 1, 2024

Related U.S. Application Data

(60) Provisional application No. 63/393,396, filed on Jul. 29, 2022.

(51) Int. Cl.
*H01J 49/00* (2006.01)
*G01N 30/86* (2006.01)
*G06F 18/2415* (2023.01)

(52) U.S. Cl.
CPC ...... *H01J 49/0036* (2013.01); *G01N 30/8631* (2013.01); *G06F 18/24155* (2023.01)

(58) Field of Classification Search
None
See application file for complete search history.

(56) References Cited

U.S. PATENT DOCUMENTS

| | | | |
|---|---|---|---|
| 8,604,421 | B2 | 12/2013 | Skilling et al. |
| 9,837,255 | B2 | 12/2017 | Stephenson, Jr. et al. |
| 11,515,136 | B2 | 11/2022 | Richardson et al. |
| 11,579,144 | B2 | 2/2023 | Mallick |
| 11,640,901 | B2 * | 5/2023 | Bern ................... H01J 49/0036 |
| | | | 702/28 |
| 2013/0200258 | A1 | 8/2013 | Skilling et al. |
| 2014/0303932 | A1 * | 10/2014 | Snow ........................ G01J 3/28 |
| | | | 702/180 |
| 2017/0205425 | A1 * | 7/2017 | Yip .................... G01N 33/6848 |

(Continued)

FOREIGN PATENT DOCUMENTS

| | | |
|---|---|---|
| GB | 2520758 A | 6/2015 |
| WO | 2022167796 A1 | 8/2022 |

OTHER PUBLICATIONS

Morgner et al., "Massign: An Assignment Strategy for Maximizing Information from the Mass Spectra of Heterogeneous Protein Assemblies" Supporting information Mar. 2012 (Year: 2012).*

(Continued)

*Primary Examiner* — Daniel F. McMahon

(57) ABSTRACT

Disclosed herein are charge state deconvolution systems, as well as related methods, computing devices, and computer-readable media. For example, in some embodiments, a charge state deconvolution apparatus includes first logic to identify peaks in a mass spectrum; second logic to deconvolve the masses of the identified peaks and identify clusters of deconvolved masses that have contiguous charge states; and third logic to calculate a Bayesian fitness measure and perform an iterative decremental procedure to perform charge state deconvolution.

15 Claims, 9 Drawing Sheets

(56) References Cited

U.S. PATENT DOCUMENTS

2018/0301326 A1*  10/2018  Bern .................... G06N 3/126
2019/0096645 A1*   3/2019  Richardson ............ H01J 49/26

OTHER PUBLICATIONS

Sun Y, Zhang J, Braga-Neto U, Dougherty ER. BPDA—a Bayesian peptide detection algorithm for mass spectrometry. BMC Bioinformatics. Sep. 29, 2010;11:490. (Year: 2010).*

Sun Y, Zhang J, Braga-Neto U, Dougherty ER. BPDA—a Bayesian peptide detection algorithm for mass spectrometry. BMC Bioinformatics. Sep. 29, 2010;11:490. doi: 10.1186/1471-2105-11-490. PMID: 20920238; PMCID: PMC3098078. (Year: 2010).*

Gazis, P.R. "A Bayesian Fitness Measure to Score the Results from a Charge State Deconvolution" 2004, 7 pages.

Marty et al. "Bayesian Deconvolution of Mass and Ion Mobility Spectra: From Binary Interactions to Polydisperse Ensembles" Analytical Chemistry, Apr. 21, 2015, vol. 87, No. 8, pp. 4370-4276.

Kostelic et al. "UniDecCD: Deconvolution of Charge Detection-Mass Spectrometry Data," Nov. 9, 2021, vol. 93, No. 44, pp. 14722-14729.

Morgner et al. "Massign: An Assignment Strategy for Maximizing Information from the Mass Spectra of Heterogeneous Protein Assemblies", Analytical Chemistry, vol. 84, No. 6, Mar. 2012, pp. 2939-2948.

Marty et al. "Bayesian Deconvolution of Mass and Ion Mobility Spectra: From Binary Interactions to Polydisperse Ensembles" Analytical Chemistry, vol. 87, No. 8, Apr. 2015, pp. 4370-4376.

Sun et al. "BPDA—A Bayesian peptide detection algorithm for mass spectrometry" BMC Bioinformatics, Biomed Central, London, GB, vol. 11, No. 1, Sep. 29, 2010, p. 490.

Millan-Martin et al. "Optimisation of the use of sliding window deconvolution for comprehensive charaterisation of trastuzumab and adalimumab charge variants by native high resolution mass spectrometry" European Journal of Pharmaceutics and Bioharmaceutics, vol. 158, 2021 pp. 83-95.

* cited by examiner

BAYESIAN DECREMENTAL SCHEME FOR CHARGE STATE DECONVOLUTION

CROSS-REFERENCE TO RELATED APPLICATIONS

This application claims the priority of U.S. Provisional Application Ser. No. 63/315,621, filed on Mar. 2, 2022, the disclosure of which is incorporated herein by reference in its entirety

BACKGROUND

Charge state deconvolution of isotopically unresolved spectra is an essential step in the identification of components in Mass Spectrometry data. It can also be difficult to accomplish. Existing algorithms can be complex, slow, and accompanied by sensitivity and false positive issues. They can also have difficulties distinguishing between harmonics and multimers or allocating the signal from peaks in the m/z spectra that are shared by two or more components. As such, improved methods for charge state deconvolution are desired.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, not by way of limitation, in the figures of the accompanying drawings.

DETAILED DESCRIPTION

Figure 1:
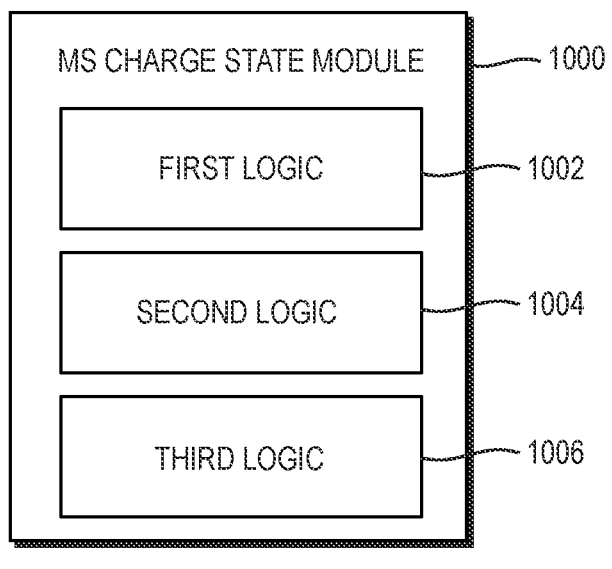
FIG. 1 is a block diagram of an example mass spectrometry charge state module for performing charge state deconvolution, in accordance with various embodiments.

Disclosed herein are charge state deconvolution systems, as well as related methods, computing devices, and computer-readable media. For example, in some embodiments, a charge state deconvolution apparatus can include first logic to identify peaks in a mass spectrum; second logic to deconvolve the masses of the identified peaks and identify clusters of deconvolved mases that have contiguous charge states; and third logic to calculate a Bayesian fitness measure and an iterative decremental procedure to perform charge state deconvolution.

The charge state deconvolution embodiments disclosed herein may achieve improved performance relative to conventional approaches. For example, charge state deconvolution of isotopically unresolved spectra is an essential step in the identification of components in Mass Spectrometry data. Existing algorithms can be complex, slow, and accompanied by sensitivity and false positive issues. They can also have difficulties distinguishing between harmonics and multimers or allocating the signal from peaks in the m/z spectra that are shared by two or more components. This disclosure describes a charge state deconvolution scheme that uses a Bayesian fitness measure in conjunction with a decremental scheme to address these issues, and perform fast, robust, and reliable charge state deconvolution of isotopically unresolved spectra. The embodiments disclosed herein thus provide improvements to scientific instrument technology (e.g., improvements in the computer technology supporting such scientific instruments, among other improvements).

Various ones of the embodiments disclosed herein may improve upon conventional approaches to achieve the technical advantages of increase accuracy and speed Such technical advantages are not achievable by routine and conventional approaches, and all users of systems including such embodiments may benefit from these advantages (e.g., by assisting the user in the performance of a technical task, such as identifying components in mass spectrometry data, by means of a guided human-machine interaction process). The technical features of the embodiments disclosed herein are thus decidedly unconventional in the field of charge state deconvolution of mass spectrometry data, as are the combinations of the features of the embodiments disclosed herein. The present disclosure thus introduces functionality that neither a conventional computing device, nor a human, could perform.

Accordingly, the embodiments of the present disclosure may serve any of a number of technical purposes, such as separation of sources in a mixed signal or providing a faster processing of sensor data. In particular, the present disclosure provides technical solutions to technical problems, including but not limited to charge state deconvolution of mass spectrometry data.

The embodiments disclosed herein thus provide improvements to mass spectrometry technology (e.g., improvements in the computer technology supporting mass spectrometry, among other improvements).

In the following detailed description, reference is made to the accompanying drawings that form a part hereof wherein like numerals designate like parts throughout, and in which is shown, by way of illustration, embodiments that may be practiced. It is to be understood that other embodiments may be utilized, and structural or logical changes may be made, without departing from the scope of the present disclosure. Therefore, the following detailed description is not to be taken in a limiting sense.

Various operations may be described as multiple discrete actions or operations in turn, in a manner that is most helpful in understanding the subject matter disclosed herein. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

For the purposes of the present disclosure, the phrases "A and/or B" and "A or B" mean (A), (B), or (A and B). For the purposes of the present disclosure, the phrases "A, B, and/or C" and "A, B, or C" mean (A), (B), (C), (A and B), (A and C), (B and C), or (A, B, and C). Although some elements may be referred to in the singular (e.g., "a processing device"), any appropriate elements may be represented by multiple instances of that element, and vice versa. For example, a set of operations described as performed by a processing device may be implemented with different ones of the operations performed by different processing devices.

The description uses the phrases "an embodiment," "various embodiments," and "some embodiments," each of which may refer to one or more of the same or different embodiments. Furthermore, the terms "comprising," "including," "having," and the like, as used with respect to embodiments of the present disclosure, are synonymous. When used to describe a range of dimensions, the phrase "between X and Y" represents a range that includes X and Y. As used herein, an "apparatus" may refer to any individual device, collection of devices, part of a device, or collections of parts of devices. The drawings are not necessarily to scale.

FIG. 1 is a block diagram of a mass spectrometry charge state module 1000 for performing support operations, in accordance with various embodiments. The mass spectrometry charge state module 1000 may be implemented by circuitry (e.g., including electrical and/or optical components), such as a programmed computing device. The logic of the mass spectrometry charge state module 1000 may be included in a single computing device or may be distributed across multiple computing devices that are in communication with each other as appropriate. Examples of computing devices that may, singly or in combination, implement the mass spectrometry charge state module 1000 are discussed herein with reference to the computing device 4000 of FIG. 4, and examples of systems of interconnected computing devices, in which the mass spectrometry charge state module 1000 may be implemented across one or more of the computing devices, is discussed herein with reference to the charge state deconvolution system 5000 of FIG. 5.

The mass spectrometry charge state module 1000 may include first logic 1002, second logic 1004, and third logic 1006. As used herein, the term "logic" may include an apparatus that is to perform a set of operations associated with the logic. For example, any of the logic elements included in the support module 1000 may be implemented by one or more computing devices programmed with instructions to cause one or more processing devices of the computing devices to perform the associated set of operations. In a particular embodiment, a logic element may include one or more non-transitory computer-readable media having instructions thereon that, when executed by one or more processing devices of one or more computing devices, cause the one or more computing devices to perform the associated set of operations. As used herein, the term "module" may refer to a collection of one or more logic elements that, together, perform a function associated with the module. Different ones of the logic elements in a module may take the same form or may take different forms. For example, some logic in a module may be implemented by a programmed general-purpose processing device, while other logic in a module may be implemented by an application-specific integrated circuit (ASIC). In another example, different ones of the logic elements in a module may be associated with different sets of instructions executed by one or more processing devices. A module may not include all of the logic elements depicted in the associated drawing; for example, a module may include a subset of the logic elements depicted in the associated drawing when that module is to perform a subset of the operations discussed herein with reference to that module.

The first logic 1002 may identify peaks in a mass spectrum. Peak detection can be performed to identify and characterize peaks in the m/z spectrum. In various embodiments, a parameterless peak detection algorithm, such as Quality Peak Detection (QPD) or a system based on Bayesian Blocks can be used. Peak detection can involve smoothing and/or baseline correction can be performed prior to detecting the peaks in the mass spectra. Various criteria are known in the art for detecting peaks, including but not limited to signal-to-noise ratio, detection/intensity threshold, slopes of peaks, local maximum, shape ratio, ridge lines, model-based criterion, and peak width.

The second logic 1004 may deconvolve the masses of the identified peaks and identify clusters of deconvolved mases that have contiguous charge states. Mass deconvolution can be performed to determine the possible values of deconvolved mass for a range of charge states for each m/z peak identified. In various embodiments, the masses can be sorted by increasing value. In various embodiments, identifying clusters of deconvolved masses that have a contiguous charge state can involve using a sliding window on the deconvolved masses.

The third logic 1006 may calculate a Bayesian fitness measure and perform an iterative decremental procedure to perform charge state deconvolution. The Bayesian fitness measure can be calculated for each cluster. A fraction of the intensities associated with the cluster with the highest Bayesian fitness measure can be subtracted from the mass spectrum, such as from the centroided mass spectrum. The Bayesian fitness measure can be recalculated for all of the clusters and the next cluster with the highest Bayesian fitness measure can be selected for partial subtraction from the mass spectrum. This can be repeated until a threshold is reached, such as the greatest peak intensity in the residual spectrum is below a threshold or the average intensity of all peaks in the residual spectrum is below a threshold.

Figure 2:
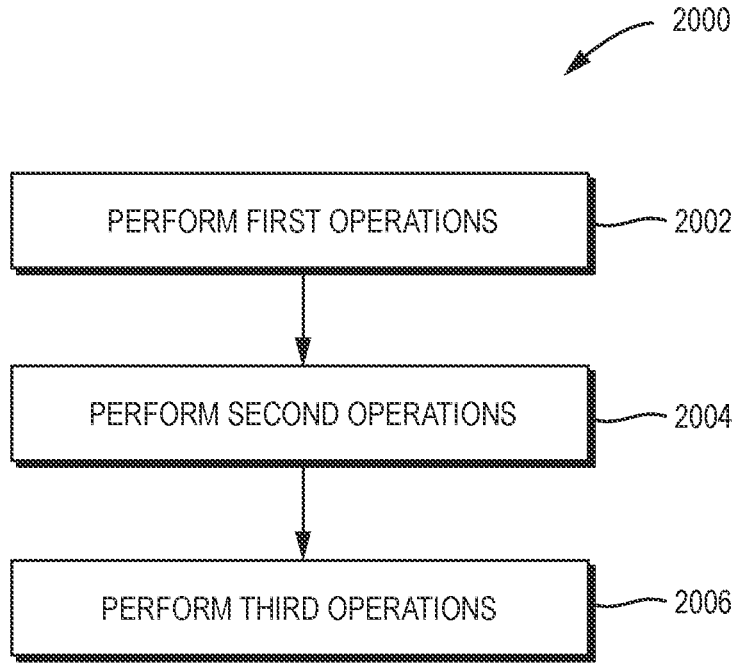
FIG. 2 is a flow diagram of an example method of performing charge state deconvolution, in accordance with various embodiments.

FIG. 2 is a flow diagram of a method 2000 of performing support operations, in accordance with various embodiments. Although the operations of the method 2000 may be illustrated with reference to particular embodiments disclosed herein (e.g., the mass spectrometry charge state module 1000 discussed herein with reference to FIG. 1, the GUI 3000 discussed herein with reference to FIG. 3, the computing devices 4000 discussed herein with reference to FIG. 4, and/or the charge state deconvolution system 5000 discussed herein with reference to FIG. 5), the method 2000 may be used in any suitable setting to perform any suitable support operations. Operations are illustrated once each and in a particular order in FIG. 2, but the operations may be reordered and/or repeated as desired and appropriate (e.g., different operations performed may be performed in parallel, as suitable).

At 2002, first operations may be performed. For example, the first logic 1002 of a support module 1000 may perform the operations of 2002. The first operations may include identifying peaks in a mass spectrum.

At 2004, second operations may be performed. For example, the second logic 1004 of a support module 1000 may perform the operations of 2004. The second operations may include deconvolving the masses of the identified peaks and identifying clusters of deconvolved mases that have contiguous charge states.

At 2006, third operations may be performed. For example, the third logic 1006 of a support module 1000 may perform the operations of 2006. The third operations may include calculating a Bayesian fitness measure and performing an iterative decremental procedure to perform charge state deconvolution.

Figure 4:
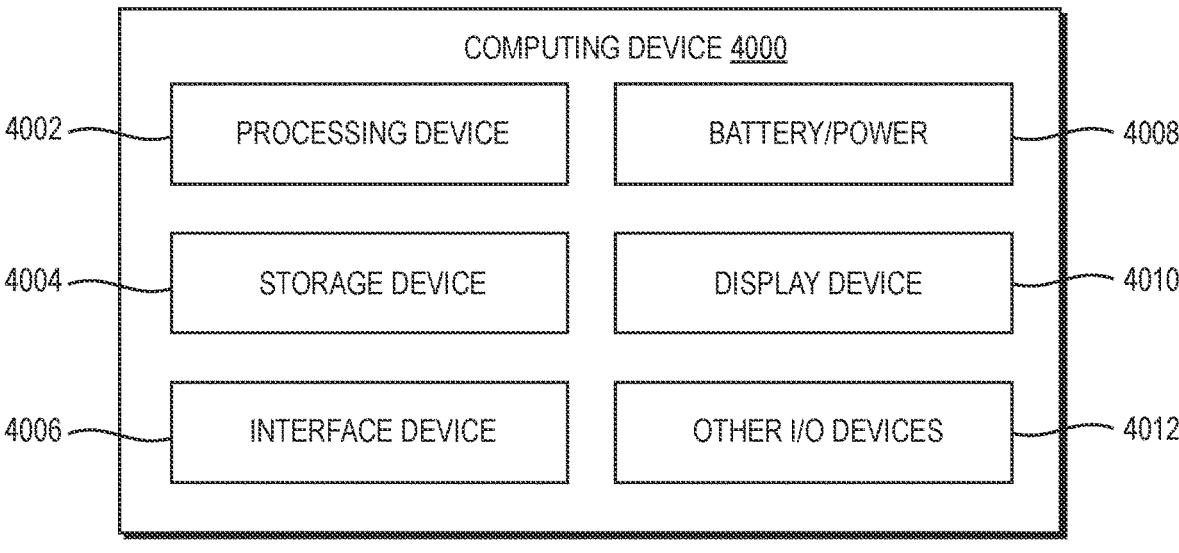
FIG. 4 is a block diagram of an example computing device that may perform some or all of the charge state deconvolution methods disclosed herein, in accordance with various embodiments.
Figure 5:
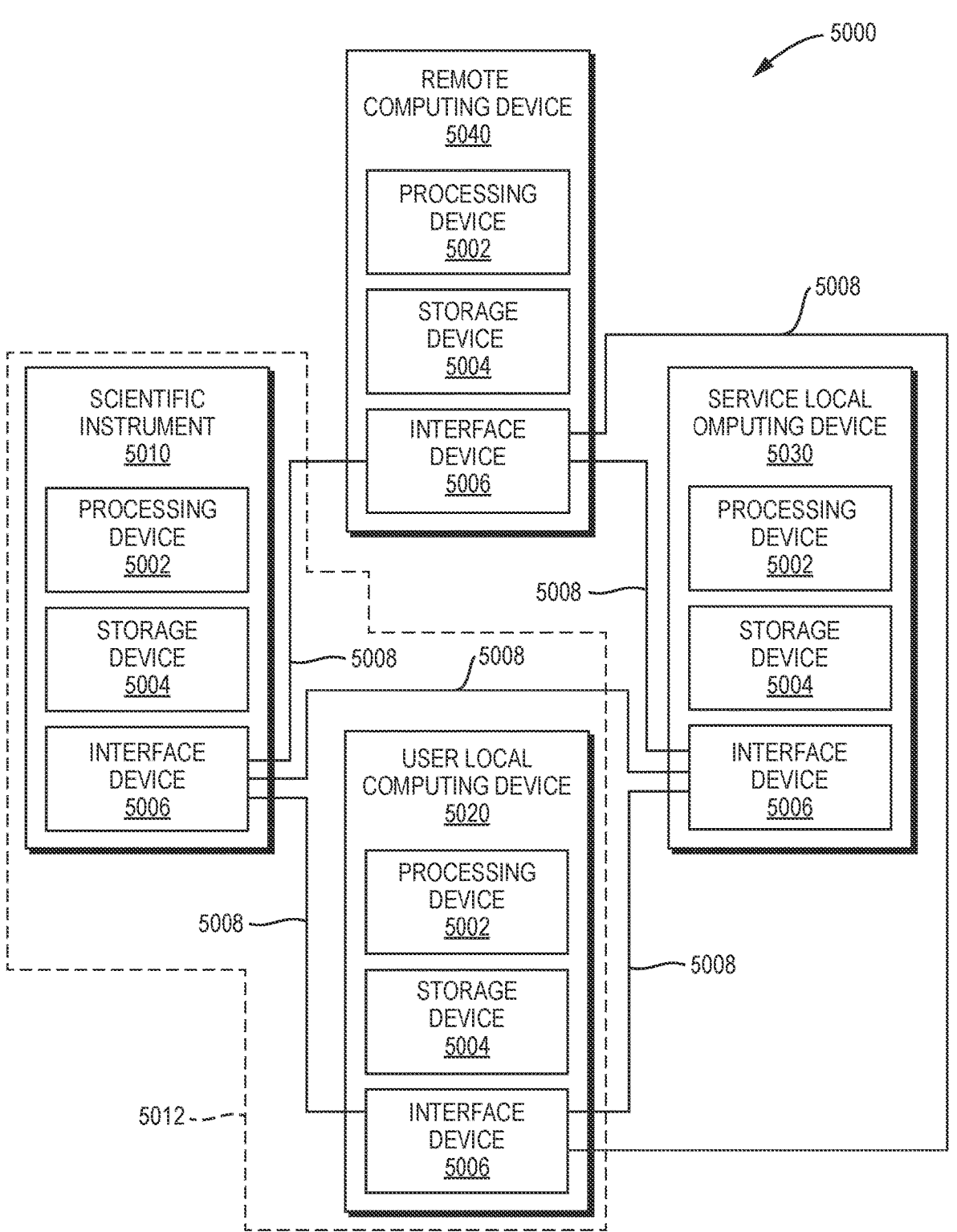
FIG. 5 is a block diagram of an example scientific instrument support system in which some or all of the charge state deconvolution methods disclosed herein may be performed, in accordance with various embodiments.

The charge state deconvolution methods disclosed herein may include interactions with a human user (e.g., via the user local computing device 5020 discussed herein with reference to FIG. 5). These interactions may include providing information to the user (e.g., information regarding the operation of a scientific instrument such as the scientific instrument 5010 of FIG. 5, information regarding a sample being analyzed or other test or measurement performed by a scientific instrument, information retrieved from a local or remote database, or other information) or providing an option for a user to input commands (e.g., to control the operation of a scientific instrument such as the scientific instrument 5010 of FIG. 5, or to control the analysis of data generated by a scientific instrument), queries (e.g., to a local or remote database), or other information. In some embodiments, these interactions may be performed through a graphical user interface (GUI) that includes a visual display on a display device (e.g., the display device 4010 discussed herein with reference to FIG. 4) that provides outputs to the user and/or prompts the user to provide inputs (e.g., via one or more input devices, such as a keyboard, mouse, trackpad, or touchscreen, included in the other I/O devices 4012 discussed herein with reference to FIG. 4). The charge state deconvolution systems disclosed herein may include any suitable GUIs for interaction with a user.

Figure 3:
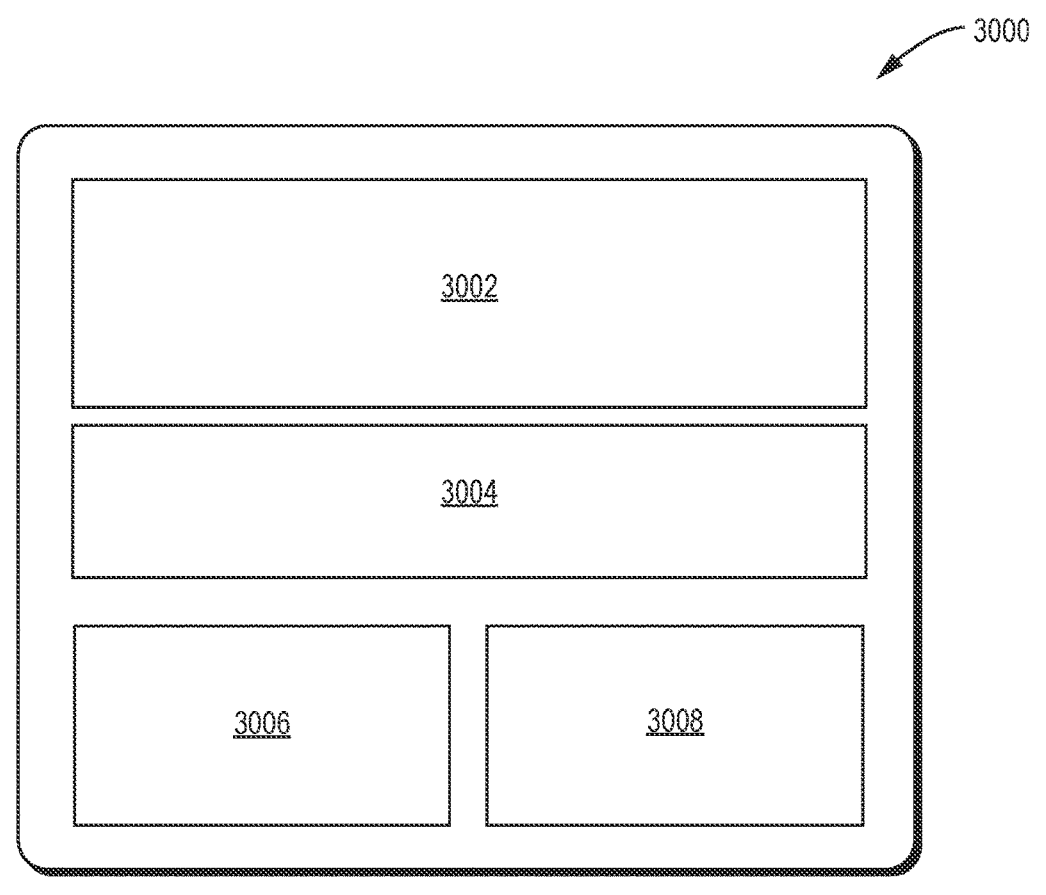
FIG. 3 is an example of a graphical user interface that may be used in the performance of some or all of the charge state deconvolution methods disclosed herein, in accordance with various embodiments.

FIG. 3 depicts an example GUI 3000 that may be used in the performance of some or all of the support methods disclosed herein, in accordance with various embodiments. As noted above, the GUI 3000 may be provided on a display device (e.g., the display device 4010 discussed herein with reference to FIG. 4) of a computing device (e.g., the computing device 4000 discussed herein with reference to FIG. 4) of a charge state deconvolution system (e.g., the charge state deconvolution system 5000 discussed herein with reference to FIG. 5), and a user may interact with the GUI 3000 using any suitable input device (e.g., any of the input devices included in the other I/O devices 4012 discussed herein with reference to FIG. 4) and input technique (e.g., movement of a cursor, motion capture, facial recognition, gesture detection, voice recognition, actuation of buttons, etc.).

The GUI 3000 may include a data display region 3002, a data analysis region 3004, a scientific instrument control region 3006, and a settings region 3008. The particular number and arrangement of regions depicted in FIG. 3 is simply illustrative, and any number and arrangement of regions, including any desired features, may be included in a GUI 3000.

The data display region 3002 may display data generated by a scientific instrument (e.g., the scientific instrument 5010 discussed herein with reference to FIG. 5). For example, the data display region 3002 may display the mass spectrum.

The data analysis region 3004 may display the results of data analysis (e.g., the results of analyzing the data illustrated in the data display region 3002 and/or other data). For example, the data analysis region 3004 may display charge states calculated for the various peaks in the mass spectrum. In some embodiments, the data display region 3002 and the data analysis region 3004 may be combined in the GUI 3000 (e.g., to include data output from a scientific instrument, and some analysis of the data, in a common graph or region).

The scientific instrument control region 3006 may include options that allow the user to control a scientific instrument (e.g., the scientific instrument 5010 discussed herein with reference to FIG. 5). For example, the scientific instrument control region 3006 may include settings for the mass spectrometer to obtain a mass spectrum from a sample.

The settings region 3008 may include options that allow the user to control the features and functions of the GUI 3000 (and/or other GUIs) and/or perform common computing operations with respect to the data display region 3002 and data analysis region 3004 (e.g., saving data on a storage device, such as the storage device 4004 discussed herein with reference to FIG. 4, sending data to another user, labeling data, etc.).

As noted above, the mass spectrometry charge state module 1000 may be implemented by one or more computing devices. FIG. 4 is a block diagram of a computing device 4000 that may perform some or all of the charge state deconvolution methods disclosed herein, in accordance with various embodiments. In some embodiments, the mass spectrometry charge state module 1000 may be implemented by a single computing device 4000 or by multiple computing devices 4000. Further, as discussed below, a computing device 4000 (or multiple computing devices 4000) that implements the mass spectrometry charge state module 1000 may be part of one or more of the scientific instruments 5010, the user local computing device 5020, the service local computing device 5030, or the remote computing device 5040 of FIG. 5.

The computing device 4000 of FIG. 4 is illustrated as having a number of components, but any one or more of these components may be omitted or duplicated, as suitable for the application and setting. In some embodiments, some or all of the components included in the computing device 4000 may be attached to one or more motherboards and enclosed in a housing (e.g., including plastic, metal, and/or other materials). In some embodiments, some these components may be fabricated onto a single system-on-a-chip (SoC) (e.g., an SoC may include one or more processing devices 4002 and one or more storage devices 4004). Additionally, in various embodiments, the computing device 4000 may not include one or more of the components illustrated in FIG. 4, but may include interface circuitry (not shown) for coupling to the one or more components using any suitable interface (e.g., a Universal Serial Bus (USB) interface, a High-Definition Multimedia Interface (HDMI) interface, a Controller Area Network (CAN) interface, a Serial Peripheral Interface (SPI) interface, an Ethernet interface, a wireless interface, or any other appropriate interface). For example, the computing device 4000 may not include a display device 4010, but may include display device interface circuitry (e.g., a connector and driver circuitry) to which a display device 4010 may be coupled.

The computing device 4000 may include a processing device 4002 (e.g., one or more processing devices). As used herein, the term "processing device" may refer to any device or portion of a device that processes electronic data from registers and/or memory to transform that electronic data into other electronic data that may be stored in registers and/or memory. The processing device 4002 may include one or more digital signal processors (DSPs), application-specific integrated circuits (ASICs), central processing units (CPUs), graphics processing units (GPUs), cryptoprocessors (specialized processors that execute cryptographic algorithms within hardware), server processors, or any other suitable processing devices.

The computing device 4000 may include a storage device 4004 (e.g., one or more storage devices). The storage device 4004 may include one or more memory devices such as random access memory (RAM) (e.g., static RAM (SRAM) devices, magnetic RAM (M RAM) devices, dynamic RAM (DRAM) devices, resistive RAM (RRAM) devices, or conductive-bridging RAM (CBRAM) devices), hard drive-based memory devices, solid-state memory devices, networked drives, cloud drives, or any combination of memory devices. In some embodiments, the storage device 4004 may include memory that shares a die with a processing device 4002. In such an embodiment, the memory may be used as cache memory and may include embedded dynamic random access memory (eDRAM) or spin transfer torque magnetic random access memory (STT-MRAM), for example. In some embodiments, the storage device 4004 may include non-transitory computer readable media having instructions thereon that, when executed by one or more processing devices (e.g., the processing device 4002), cause the computing device 4000 to perform any appropriate ones of or portions of the methods disclosed herein.

The computing device 4000 may include an interface device 4006 (e.g., one or more interface devices 4006). The interface device 4006 may include one or more communication chips, connectors, and/or other hardware and software to govern communications between the computing device 4000 and other computing devices. For example, the interface device 4006 may include circuitry for managing wireless communications for the transfer of data to and from the computing device 4000. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not. Circuitry included in the interface device 4006 for managing wireless communications may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3GPP2"), etc.). In some embodiments, circuitry included in the interface device 4006 for managing wireless communications may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. In some embodiments, circuitry included in the interface device 4006 for managing wireless communications may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). In some embodiments, circuitry included in the interface device 4006 for managing wireless communications may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. In some embodiments, the interface device 4006 may include one or more antennas (e.g., one or more antenna arrays) to receipt and/or transmission of wireless communications.

In some embodiments, the interface device 4006 may include circuitry for managing wired communications, such as electrical, optical, or any other suitable communication protocols. For example, the interface device 4006 may include circuitry to support communications in accordance with Ethernet technologies. In some embodiments, the interface device 4006 may support both wireless and wired communication, and/or may support multiple wired communication protocols and/or multiple wireless communication protocols. For example, a first set of circuitry of the interface device 4006 may be dedicated to shorter-range wireless communications such as Wi-Fi or Bluetooth, and a second set of circuitry of the interface device 4006 may be dedicated to longer-range wireless communications such as global positioning system (GPS), EDGE, GPRS, CDMA, WiMAX, LTE, EV-DO, or others. In some embodiments, a first set of circuitry of the interface device 4006 may be dedicated to wireless communications, and a second set of circuitry of the interface device 4006 may be dedicated to wired comm unications.

The computing device 4000 may include battery/power circuitry 4008. The battery/power circuitry 4008 may include one or more energy storage devices (e.g., batteries or capacitors) and/or circuitry for coupling components of the computing device 4000 to an energy source separate from the computing device 4000 (e.g., AC line power).

The computing device 4000 may include a display device 4010 (e.g., multiple display devices). The display device 4010 may include any visual indicators, such as a heads-up display, a computer monitor, a projector, a touchscreen display, a liquid crystal display (LCD), a light-emitting diode display, or a flat panel display.

The computing device 4000 may include other input/output (I/O) devices 4012. The other I/O devices 4012 may include one or more audio output devices (e.g., speakers, headsets, earbuds, alarms, etc.), one or more audio input devices (e.g., microphones or microphone arrays), location devices (e.g., GPS devices in communication with a satellite-based system to receive a location of the computing device 4000, as known in the art), audio codecs, video codecs, printers, sensors (e.g., thermocouples or other temperature sensors, humidity sensors, pressure sensors, vibration sensors, accelerometers, gyroscopes, etc.), image capture devices such as cameras, keyboards, cursor control devices such as a mouse, a stylus, a trackball, or a touchpad, bar code readers, Quick Response (QR) code readers, or radio frequency identification (RFID) readers, for example.

The computing device 4000 may have any suitable form factor for its application and setting, such as a handheld or mobile computing device (e.g., a cell phone, a smart phone, a mobile internet device, a tablet computer, a laptop computer, a netbook computer, an ultrabook computer, a personal digital assistant (PDA), an ultra mobile personal computer, etc.), a desktop computing device, or a server computing device or other networked computing component.

One or more computing devices implementing any of the charge state deconvolution modules or methods disclosed herein may be part of a charge state deconvolution system. FIG. 5 is a block diagram of an example charge state deconvolution system 5000 in which some or all of the charge state deconvolution methods disclosed herein may be performed, in accordance with various embodiments. The charge state deconvolution modules and methods disclosed herein (e.g., the mass spectrometry charge state module 1000 of FIG. 1 and the method 2000 of FIG. 2) may be implemented by one or more of the scientific instruments 5010, the user local computing device 5020, the service local computing device 5030, or the remote computing device 5040 of the charge state deconvolution system 5000.

Any of the scientific instrument 5010, the user local computing device 5020, the service local computing device 5030, or the remote computing device 5040 may include any of the embodiments of the computing device 4000 discussed herein with reference to FIG. 4, and any of the scientific instrument 5010, the user local computing device 5020, the service local computing device 5030, or the remote computing device 5040 may take the form of any appropriate ones of the embodiments of the computing device 4000 discussed herein with reference to FIG. 4.

The scientific instrument 5010, the user local computing device 5020, the service local computing device 5030, or the remote computing device 5040 may each include a processing device 5002, a storage device 5004, and an interface device 5006. The processing device 5002 may take any suitable form, including the form of any of the processing devices 4002 discussed herein with reference to FIG. 4, and the processing devices 5002 included in different ones of the scientific instrument 5010, the user local computing device 5020, the service local computing device 5030, or the remote computing device 5040 may take the same form or different forms. The storage device 5004 may take any suitable form, including the form of any of the storage devices 5004 discussed herein with reference to FIG. 4, and the storage devices 5004 included in different ones of the scientific instrument 5010, the user local computing device 5020, the service local computing device 5030, or the remote computing device 5040 may take the same form or different forms. The interface device 5006 may take any suitable form, including the form of any of the interface devices 4006 discussed herein with reference to FIG. 4, and the interface devices 5006 included in different ones of the scientific instrument 5010, the user local computing device 5020, the service local computing device 5030, or the remote computing device 5040 may take the same form or different forms.

The scientific instrument 5010, the user local computing device 5020, the service local computing device 5030, and the remote computing device 5040 may be in communication with other elements of the charge state deconvolution system 5000 via communication pathways 5008. The communication pathways 5008 may communicatively couple the interface devices 5006 of different ones of the elements of the charge state deconvolution system 5000, as shown, and may be wired or wireless communication pathways (e.g., in accordance with any of the communication techniques discussed herein with reference to the interface devices 4006 of the computing device 4000 of FIG. 4). The particular charge state deconvolution system 5000 depicted in FIG. 5 includes communication pathways between each pair of the scientific instrument 5010, the user local computing device 5020, the service local computing device 5030, and the remote computing device 5040, but this "fully connected" implementation is simply illustrative, and in various embodiments, various ones of the communication pathways 5008 may be absent. For example, in some embodiments, a service local computing device 5030 may not have a direct communication pathway 5008 between its interface device 5006 and the interface device 5006 of the scientific instrument 5010, but may instead communicate with the scientific instrument 5010 via the communication pathway 5008 between the service local computing device 5030 and the user local computing device 5020 and the communication pathway 5008 between the user local computing device 5020 and the scientific instrument 5010.

Figure 7:
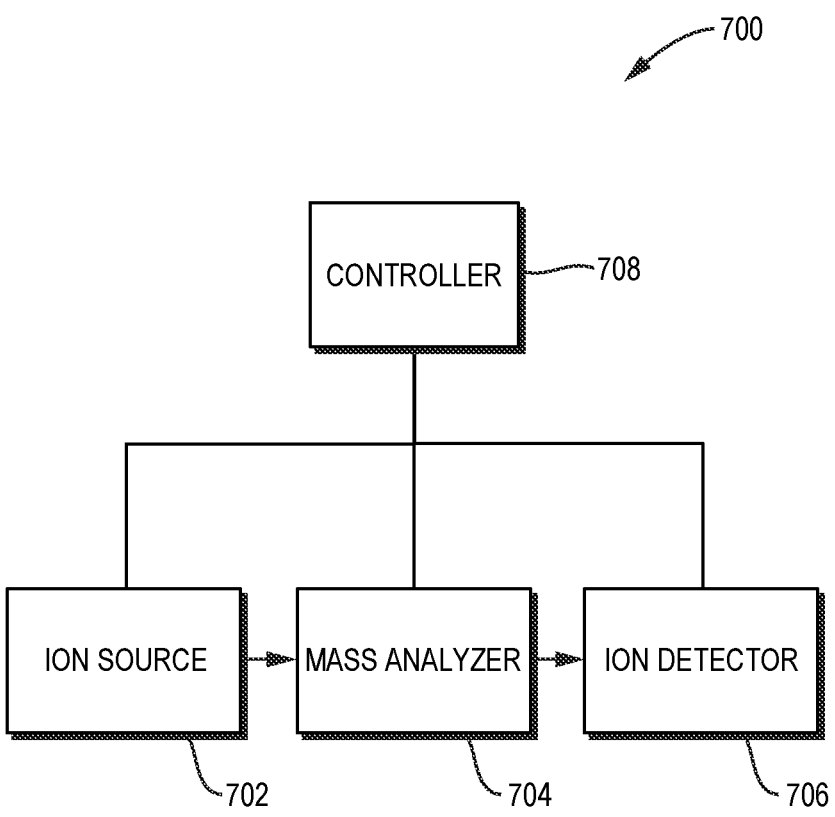
FIG. 7 is a block diagram of an example mass spectrometer, in accordance with various embodiments.

The scientific instrument 5010 may include any appropriate scientific instrument, such as a mass spectrometry platform 700 of FIG. 7.

The user local computing device 5020 may be a computing device (e.g., in accordance with any of the embodiments of the computing device 4000 discussed herein) that is local to a user of the scientific instrument 5010. In some embodiments, the user local computing device 5020 may also be local to the scientific instrument 5010, but this need not be the case; for example, a user local computing device 5020 that is in a user's home or office may be remote from, but in communication with, the scientific instrument 5010 so that the user may use the user local computing device 5020 to control and/or access data from the scientific instrument 5010. In some embodiments, the user local computing device 5020 may be a laptop, smartphone, or tablet device. In some embodiments the user local computing device 5020 may be a portable computing device.

The service local computing device 5030 may be a computing device (e.g., in accordance with any of the embodiments of the computing device 4000 discussed herein) that is local to an entity that services the scientific instrument 5010. For example, the service local computing device 5030 may be local to a manufacturer of the scientific instrument 5010 or to a third-party service company. In some embodiments, the service local computing device 5030 may communicate with the scientific instrument 5010, the user local computing device 5020, and/or the remote computing device 5040 (e.g., via a direct communication pathway 5008 or via multiple "indirect" communication pathways 5008, as discussed above) to receive data regarding the operation of the scientific instrument 5010, the user local computing device 5020, and/or the remote computing device 5040 (e.g., the results of self-tests of the scientific instrument 5010, calibration coefficients used by the scientific instrument 5010, the measurements of sensors associated with the scientific instrument 5010, etc.). In some embodiments, the service local computing device 5030 may communicate with the scientific instrument 5010, the user local computing device 5020, and/or the remote computing device 5040 (e.g., via a direct communication pathway 5008 or via multiple "indirect" communication pathways 5008, as discussed above) to transmit data to the scientific instrument 5010, the user local computing device 5020, and/or the remote computing device 5040 (e.g., to update programmed instructions, such as firmware, in the scientific instrument 5010, to initiate the performance of test or calibration sequences in the scientific instrument 5010, to update programmed instructions, such as software, in the user local computing device 5020 or the remote computing device 5040, etc.). A user of the scientific instrument 5010 may utilize the scientific instrument 5010 or the user local computing device 5020 to communicate with the service local computing device 5030 to report a problem with the scientific instrument 5010 or the user local computing device 5020, to request a visit from a technician to improve the operation of the scientific instrument 5010, to order consumables or replacement parts associated with the scientific instrument 5010, or for other purposes.

The remote computing device 5040 may be a computing device (e.g., in accordance with any of the embodiments of the computing device 4000 discussed herein) that is remote from the scientific instrument 5010 and/or from the user local computing device 5020. In some embodiments, the remote computing device 5040 may be included in a data-center or other large-scale server environment. In some embodiments, the remote computing device 5040 may include network-attached storage (e.g., as part of the storage device 5004). The remote computing device 5040 may store data generated by the scientific instrument 5010, perform analyses of the data generated by the scientific instrument 5010 (e.g., in accordance with programmed instructions), facilitate communication between the user local computing device 5020 and the scientific instrument 5010, and/or facilitate communication between the service local computing device 5030 and the scientific instrument 5010.

In some embodiments, one or more of the elements of the charge state deconvolution system 5000 illustrated in FIG. 5 may not be present. Further, in some embodiments, multiple ones of various ones of the elements of the charge state deconvolution system 5000 of FIG. 5 may be present. For example, a charge state deconvolution system 5000 may include multiple user local computing devices 5020 (e.g., different user local computing devices 5020 associated with different users or in different locations). In another example, a charge state deconvolution system 5000 may include multiple scientific instruments 5010, all in communication with service local computing device 5030 and/or a remote computing device 5040; in such an embodiment, the service local computing device 5030 may monitor these multiple scientific instruments 5010, and the service local computing device 5030 may cause updates or other information may be "broadcast" to multiple scientific instruments 5010 at the same time. Different ones of the scientific instruments 5010 in a charge state deconvolution system 5000 may be located close to one another (e.g., in the same room) or farther from one another (e.g., on different floors of a building, in different buildings, in different cities, etc.). In some embodiments, a scientific instrument 5010 may be connected to an Internet-of-Things (IoT) stack that allows for command and control of the scientific instrument 5010 through a web-based application, a virtual or augmented reality application, a mobile application, and/or a desktop application. Any of these applications may be accessed by a user operating the user local computing device 5020 in communication with the scientific instrument 5010 by the intervening remote computing device 5040. In some embodiments, a scientific instrument 5010 may be sold by the manufacturer along with one or more associated user local computing devices 5020 as part of a local scientific instrument computing unit 5012.

In some embodiments, different ones of the scientific instruments 5010 included in a charge state deconvolution system 5000 may be different types of scientific instruments 5010; for example, one scientific instrument 5010 may be a mass spectrometer, while another scientific instrument 5010 may be a liquid chromatography-mass spectrometer (LC- MS) or a gas chromatography mass spectrometer (GC-MS). In some such embodiments, the remote computing device 5040 and/or the user local computing device 5020 may combine data from different types of scientific instruments 5010 included in a charge state deconvolution system 5000.

Figure 6:
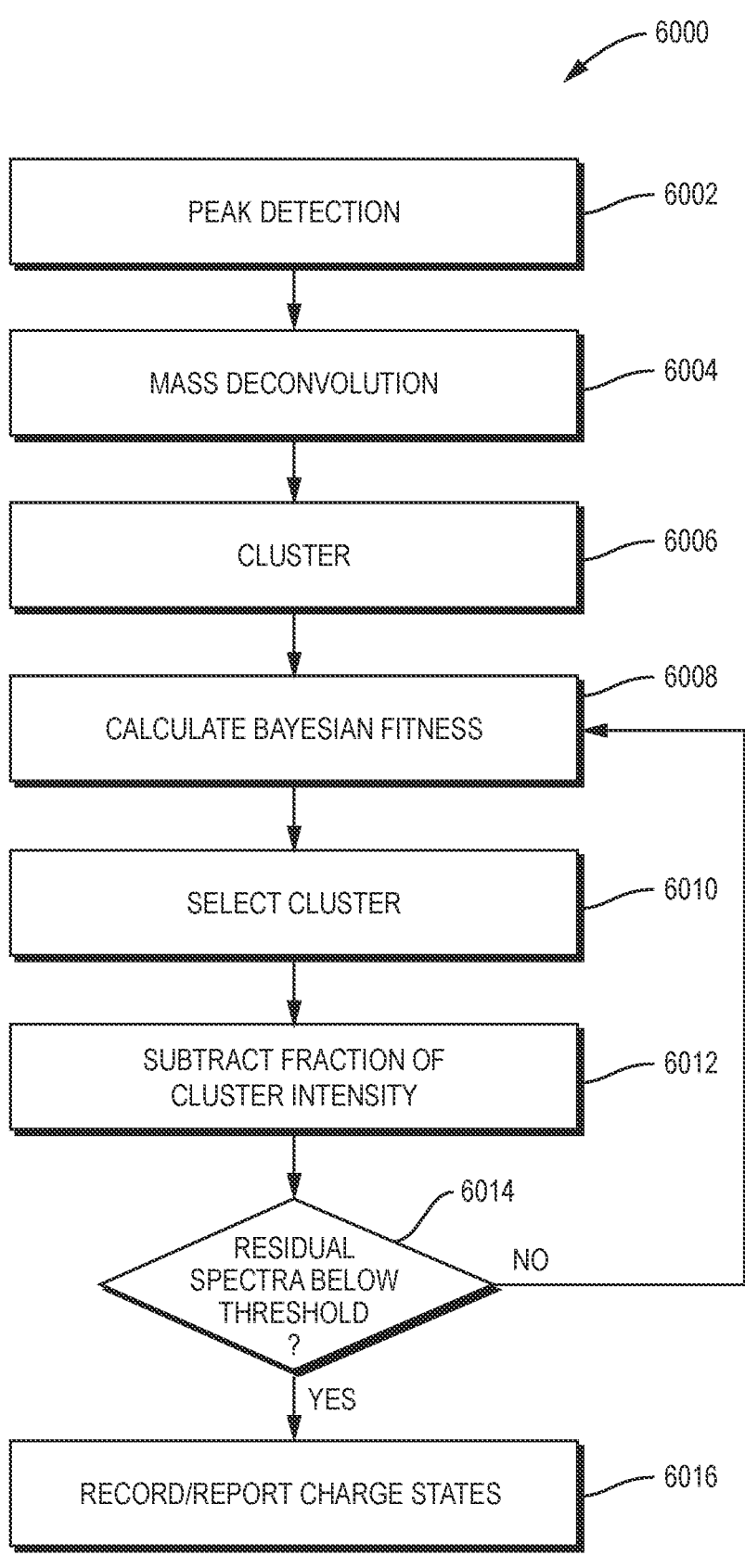
FIG. 6 is a flow diagram of an example method of performing charge state deconvolution, in accordance with various embodiments.
Figure 8:
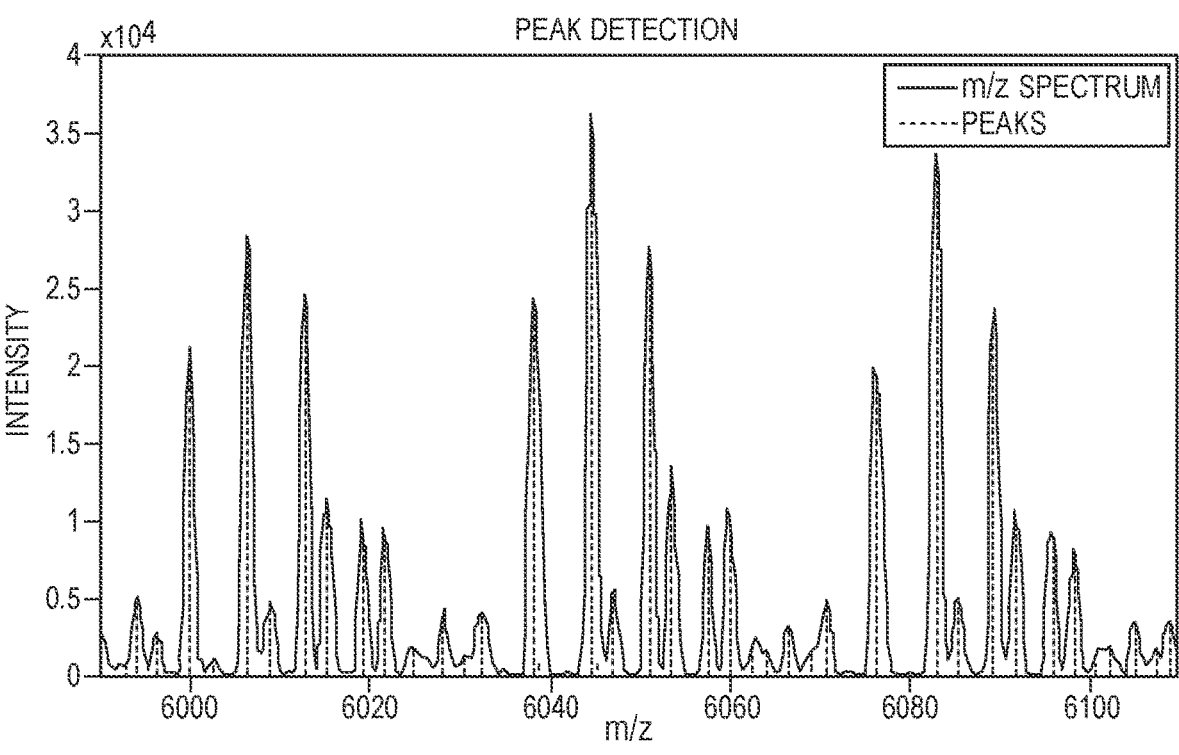
FIG. 8 is an exemplary mass spectrum illustrating the results of peak detection, in accordance with various embodiments.

FIG. 6 is a flow diagram illustrating an exemplary method 6000 of charge state deconvolution. At 6002, peak detection can be performed to identify and characterize peaks in the m/z spectrum. In various embodiments, a parameterless peak detection algorithm, such as Quality Peak Detection (QPD) or a system based on Bayesian Blocks can be used. Peak detection can involve smoothing and/or baseline correction can be performed prior to detecting the peaks in the mass spectra. Various criteria are known in the art for detecting peaks, including but not limited to signal-to-noise ratio, detection/intensity threshold, slopes of peaks, local maximum, shape ratio, ridge lines, model-based criterion, and peak width. FIG. 8 shows an exemplary mass spectrum with the peaks marked.

Figure 9:
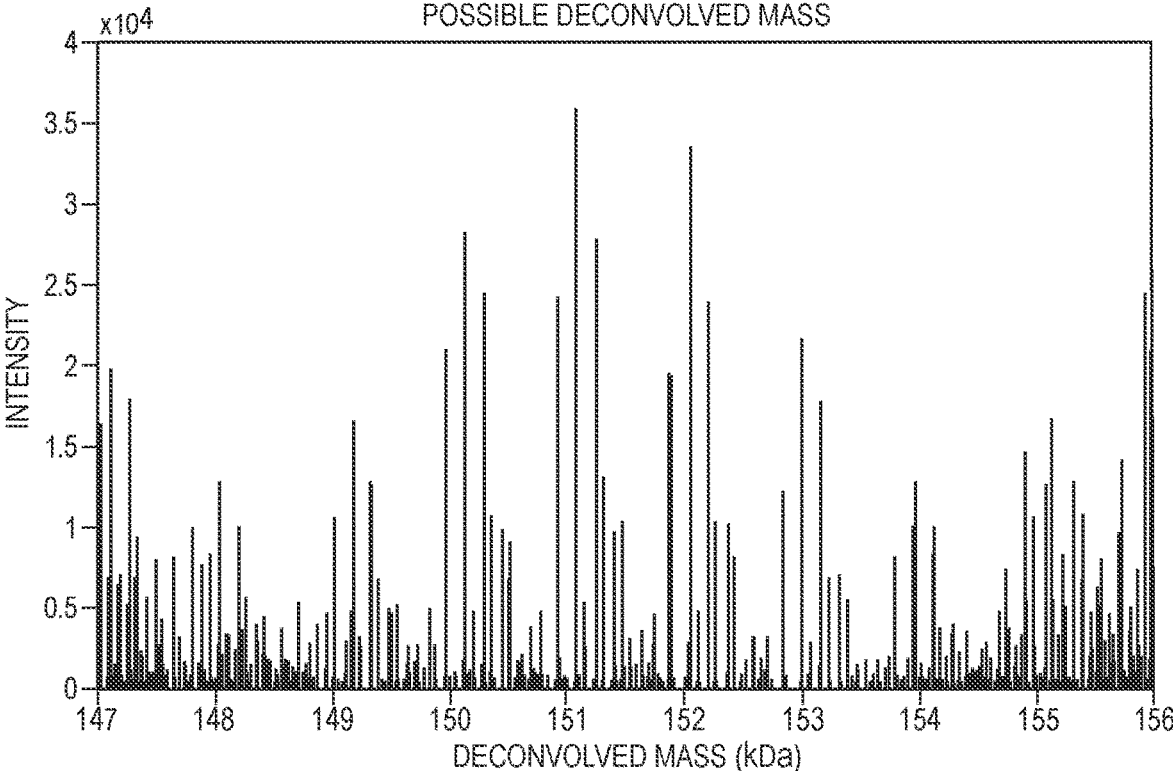
FIG. 9 is a diagram illustrating the results of mass deconvolution, in accordance with various embodiments.

At 6004, mass deconvolution can be performed to determine the possible values of deconvolved mass for a range of charge states for each m/z peak identified. In various embodiments, the masses can be sorted by increasing value. FIG. 9 illustrates exemplary deconvolved masses. The mass deconvolution can use the well-known relationship between the m/z values and the deconvolved mass shown in Formula 1 where $M_{deconvolved}$ is the deconvolved mass, $Y_{m/z}$ is the m/z value, A is the adduct mass, and Z=charge state.

$$M_{deconvolved} = (Y_{m/z} - A)Z \tag{1}$$

Figure 10:
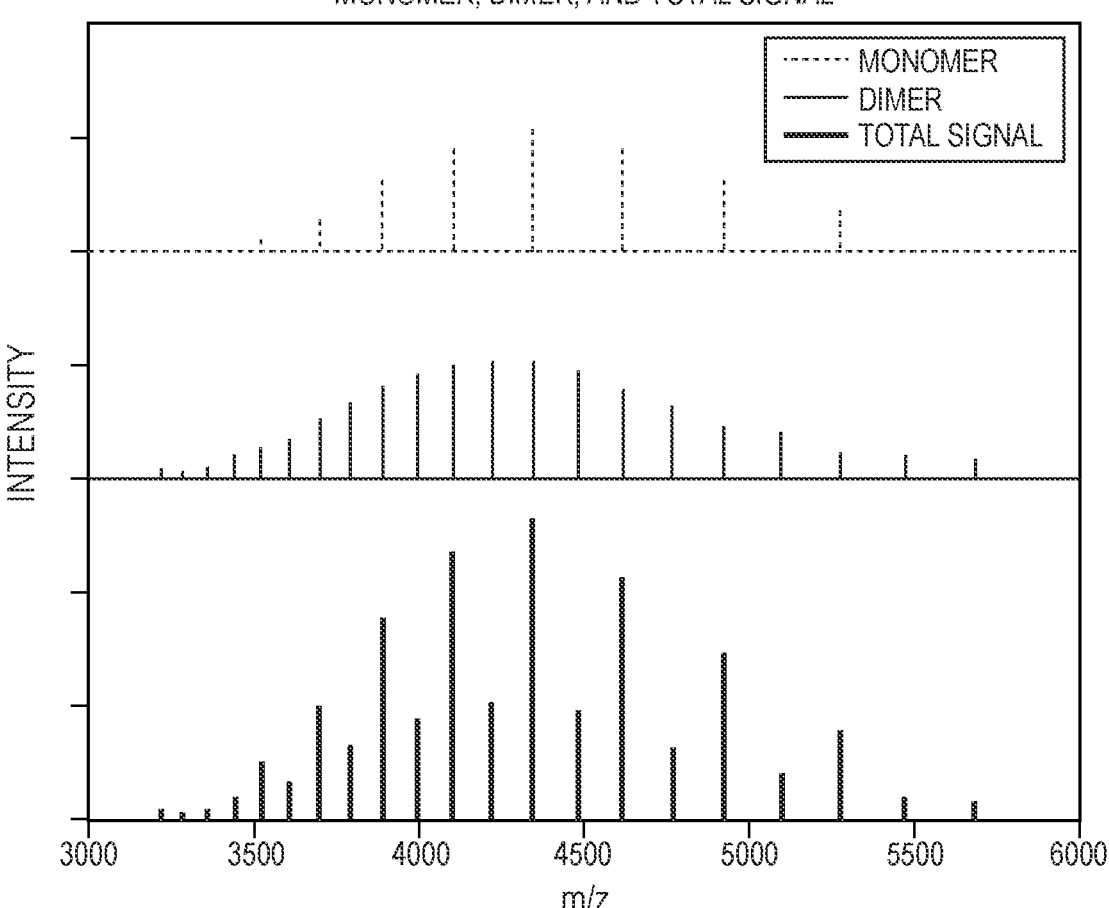
FIG. 10 is a schematic representation of how a monomer and dimer can share m/z peaks in a m/z spectrum, in accordance with various embodiments.

At 6006, a sliding window can be applied to identify clusters of deconvolved masses that have a contiguous charge state and are within some mass tolerance of each other. Generally, there will be overlap between the clusters with two or more clusters sharing the same peaks in the m/z spectrum. FIG. 10 illustrates how two clusters can overlap and share peaks.

At 6008, a Bayesian fitness measure can be calculated for each cluster. Bayes' Theorem describes the probability of an event, based on prior knowledge of conditions that might be related to the event. This can be expressed as Formula 2 where P(C|{Obs}) is the conditional probability a component, C, is valid given a set of observations, {Obs}, P({Obs}|C) is the conditional probability of observing this set of observations if the component is valid, P(C) is the prior probability that the component is valid, and P({Obs}) is the prior probability of this set of observations.

$$P(C|\{Obs\}) = P(\{Obs\}|C)P(C)/P(\{Obs\}) \tag{2}$$

Since there is no a priori reason to favor any one component or set of observations over another, P(C) and P({Obs}) can be "marginalized" by assuming they will always be the same. The conditional probability, P({Obs}|C) can depend on how 'smooth' a charge state envelope is, as described in Formula 3 where $\alpha$ is some tolerance scale, $\Delta_i$ is the difference between the intensity of the ith m/z peak in the observed charge state profile and some smoothed charge state profile for the component in question and $\Sigma\Delta_i$ is the sum of the peak intensities, $A_i$. The fitness measure can be obtained by taking the log of Formula 3, as shown in Formula 4.

$$P(\{Obs\}|C) \propto \exp\left(-\alpha \sum \Delta_i^2 / \sum A_i\right) \tag{3}$$

-continued $$\text{Fitness} = -\alpha\left(\sum \Delta_i^2\right) / \left(\sum A_i\right) \qquad 4)$$

Figure 11:
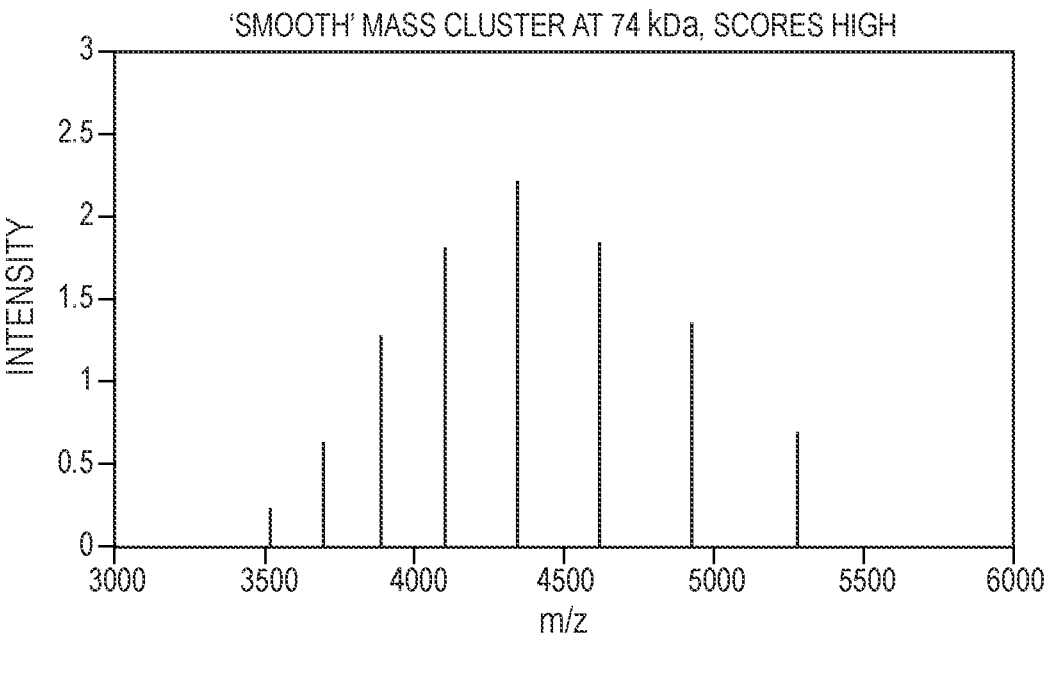
FIGS. 11 and 12 are schematic representations of the charge state profile and score for mass clusters, in accordance with various embodiments.
Figure 12:
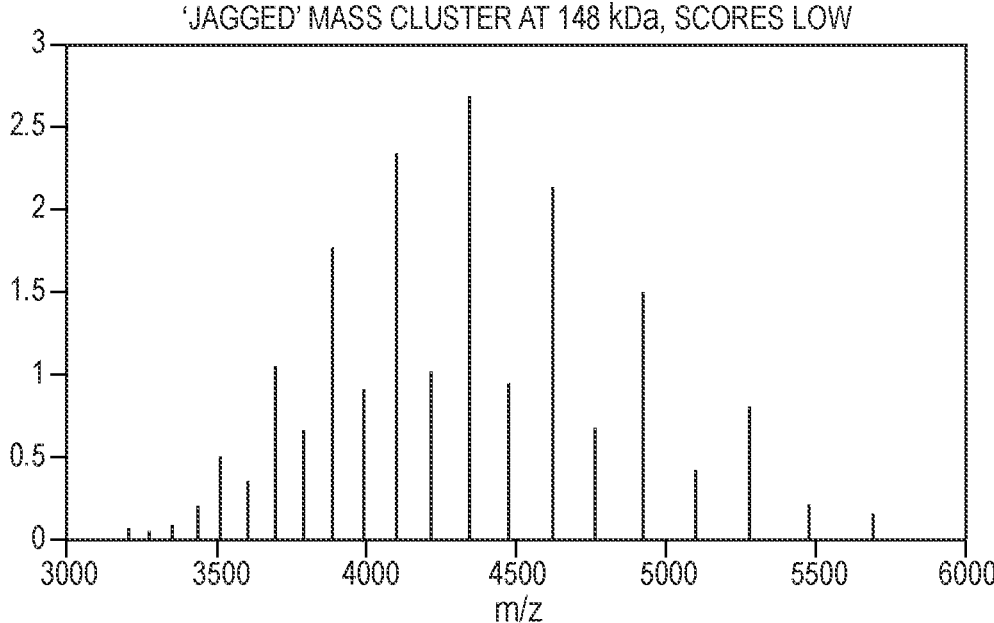

In various embodiments, this fitness measure will always be negative, with values closer to zero corresponding to a higher fitness. It rewards mass clusters for having a higher sum intensity but penalizes them if they have a 'jagged' or irregular charge state profile. This is illustrated schematically in FIGS. 11 and 12.

At 6010, a cluster can be selected based on the fitness measure. In various embodiments, the cluster with the fitness measure closest to zero can be selected as the cluster with the highest fitness.

Figures 13A, 13B, 13C, 13D, 13E, 13F:
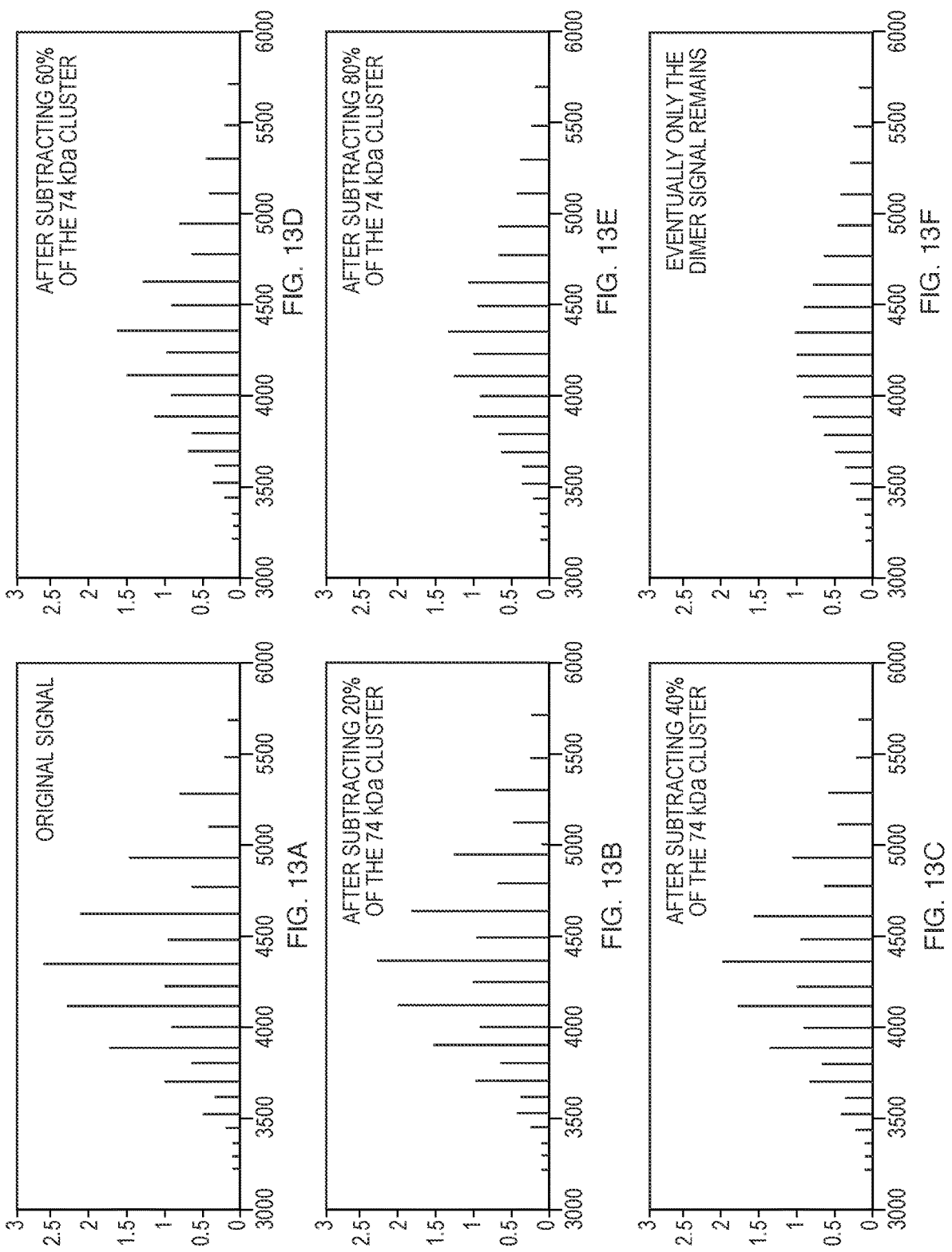
FIGS. 13A-13F is a schematic representation illustrating the process of iteratively subtracting the contribution of the higher scoring cluster from the m/z spectrum.

At 6012, a fraction of the selected cluster intensity can be subtracted from the m/z spectrum. For example, 1-10% of the peak intensities associated with the selected cluster can be subtracted from the m/z spectrum to obtain a residual spectrum. In various embodiments, the cluster intensities can be subtracted from the centroid spectrum. Generally, as the cycle is repeated, the fraction can be subtracted from the residual spectrum until the residual is below a threshold. FIG. 13 provides a schematic illustration of the process of iteratively subtracting a 74 kDa cluster until only the 148 kDa dimer cluster remains.

At 614, it can be determined if the residual spectrum is below a threshold. For example, the residual spectrum can be below the threshold when the highest peak in the residual spectrum falls below a threshold. The threshold can be determined by applying a relative abundance to the highest peak in the original spectrum. In other embodiments, the residual spectrum can be below the threshold when the average signal (average remaining peak intensity) or total signal (sum of remaining peak intensities) in the residual spectrum falls below a threshold. When the residual spectrum is below the threshold, the charge states can be reported or recorded, at 6016.

Alternatively, when the residual spectrum is not below the threshold, the Bayesian fitness for each cluster can be recalculated for the residual spectrum at 6008.

Various embodiments of mass spectrometry platform 700 can include components as displayed in the block diagram of FIG. 7. In various embodiments, elements of FIG. 7 can be incorporated into mass spectrometry platform 700. According to various embodiments, mass spectrometer 700 can include an ion source 702, a mass analyzer 704, an ion detector 706, and a controller 708.

In various embodiments, the ion source 702 generates a plurality of ions from a sample. The ion source can include, but is not limited to, a matrix assisted laser desorption/ionization (MALDI) source, electrospray ionization (ESI) source, atmospheric pressure chemical ionization (APCI) source, atmospheric pressure photoionization source (APPI), inductively coupled plasma (ICP) source, electron ionization source, chemical ionization source, photoionization source, glow discharge ionization source, thermospray ionization source, and the like.

In various embodiments, the mass analyzer 704 can separate ions based on a mass-to-charge ratio of the ions. For example, the mass analyzer 704 can include a quadrupole mass filter analyzer, a quadrupole ion trap analyzer, a time-of-flight (TOF) analyzer, an electrostatic trap (e.g., Orbitrap) mass analyzer, Fourier transform ion cyclotron resonance (FT-ICR) mass analyzer, and the like. In various embodiments, the mass analyzer 704 can also be configured to fragment the ions using collision induced dissociation (CID) electron transfer dissociation (ETD), electron capture dissociation (ECD), photo induced dissociation (PID), surface induced dissociation (SID), and the like, and further separate the fragmented ions based on the mass-to-charge ratio.

In various embodiments, the ion detector 706 can detect ions. For example, the ion detector 706 can include an electron multiplier, a Faraday cup, and the like. Ions leaving the mass analyzer can be detected by the ion detector. In various embodiments, the ion detector can be quantitative, such that an accurate count of the ions can be determined.

In various embodiments, the controller 708 can communicate with the ion source 702, the mass analyzer 704, and the ion detector 706. For example, the controller 708 can configure the ion source or enable/disable the ion source. Additionally, the controller 708 can configure the mass analyzer 704 to select a particular mass range to detect. Further, the controller 708 can adjust the sensitivity of the ion detector 706, such as by adjusting the gain. Additionally, the controller 708 can adjust the polarity of the ion detector 706 based on the polarity of the ions being detected. For example, the ion detector 706 can be configured to detect positive ions or be configured to detected negative ions.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

The following paragraphs provide various examples of the embodiments disclosed herein.

Example 1 is a charge state deconvolution apparatus, including first logic to identify peaks in a mass spectrum; second logic to deconvolve the masses of the identified peaks and identify clusters of deconvolved mases that have contiguous charge states; and third logic to calculate a Bayesian fitness measure and perform an iterative decremental procedure to perform charge state deconvolution.

Example 2 may include the subject matter of Example 1, and may further specify that the first logic, the second logic, and the third logic are implemented by a common computing device.

Example 3 may include the subject matter of Examples 1-2, wherein at least one of the first logic, the second logic, and the third logic are implemented by a computing device remote from the scientific instrument.

Example 4 may include the subject matter of Examples 1-3, wherein at least one of the first logic, the second logic, and the third logic are implemented by a user computing device.

Example 5 may include the subject matter of Examples 1-4, wherein at least one of the first logic, the second logic, and the third logic are implemented in the scientific instrument.

Example 6 may include the subject matter of Examples 1-5, wherein the second logic applies a sliding window to the deconvolved masses to identify clusters of deconvolved masses with a contiguous charge state.

Example 7 may include the subject matter of Examples 1-6, wherein the iterative decremental procedure of the third logic iteratively subtracts a small gain of the cluster with the highest Bayesian fitness measure from the deconvolved masses.

Example 8 may include the subject matter of Examples 1-7, wherein the third logic repeats using the cluster with the next highest Bayesian fitness until the average intensity in the spectra is below a threshold.

Example 9 may include the subject matter of Examples 1-7, wherein the third logic repeats using the cluster with the next highest Bayesian fitness until the largest peak in the spectra is below a threshold.

Example 10 is a method for charge state deconvolution, including identifying peaks in a mass spectrum; deconvolving the masses of the identified peaks, identifying clusters of deconvolved mases that have contiguous charge states; calculating a Bayesian fitness measure; and performing an iterative decremental procedure to perform charge state deconvolution.

Example 11 may include the subject matter of Example 10, identifying clusters of deconvolved mases that have contiguous charge states includes applying a sliding window to the deconvolved masses to identify clusters of deconvolved masses with a contiguous charge state.

Example 12 may include the subject matter of Examples 10-11, performing the iterative decremental procedure includes iteratively subtracting a small gain of the cluster with the highest Bayesian fitness measure from the deconvolved masses.

Example 13 may include the subject matter of Examples 10-12, wherein the steps of calculating a Bayesian fitness measure and performing an iterative decremental procedure are repeated using the cluster with the next highest Bayesian fitness until the largest peak in the subtracted spectra is below a threshold.

Example 14 may include the subject matter of Examples 10-12, wherein the steps of calculating a Bayesian fitness measure and performing an iterative decremental procedure are repeated using the cluster with the next highest Bayesian fitness until the average intensity in the subtracted spectra is below a threshold.

Example 15 is one or more non-transitory computer readable media having instructions thereon that, when executed by one or more processing devices of a charge state deconvolution apparatus, cause the charge state deconvolution apparatus to perform the method of Examples 10-14.

Example A includes any of the mass spectrometry charge state modules disclosed herein.

Example B includes any of the methods disclosed herein.

Example C includes any of the GUIs disclosed herein.

Example D includes any of the charge state deconvolution computing devices and systems disclosed herein.

The invention claimed is:

1. A charge state deconvolution apparatus, comprising:
first logic to identify peaks in a mass spectrum obtained using a mass spectrometry platform;

second logic to deconvolve masses of the identified peaks and identify clusters of deconvolved masses that have contiguous charge states; and third logic to calculate a Bayesian fitness measure for each identified cluster and perform an iterative decremental procedure to perform charge state deconvolution.

2. The charge state deconvolution system of claim 1, wherein the first logic, the second logic, and the third logic are implemented by a common computing device.

3. The charge state deconvolution system of claim 1, wherein at least one of the first logic, the second logic, and the third logic are implemented by a computing device remote from the mass spectrometry platform.

4. The charge state deconvolution system of claim 1, wherein at least one of the first logic, the second logic, and the third logic are implemented by a user computing device.

5. The charge state deconvolution system of claim 1, wherein at least one of the first logic, the second logic, and the third logic are implemented in the mass spectrometry platform.

6. The charge state deconvolution system of claim 1, wherein the second logic applies a sliding window to the deconvolved masses of the identified peaks to identify the clusters of deconvolved masses with contiguous charge states.

7. The charge state deconvolution system of claim 1, wherein the iterative decremental procedure of the third logic iteratively subtracts a fraction of intensities of a cluster with a highest Bayesian fitness measure from the deconvolved masses.

8. The charge state deconvolution system of claim 1, wherein the third logic repeats using a cluster with a next highest Bayesian fitness until an average intensity in a spectra is below a threshold.

9. The charge state deconvolution system of claim 1, wherein the third logic repeats using a cluster with a next highest Bayesian fitness until a largest peak in a spectra is below a threshold.

10. A method for charge state deconvolution, comprising:
identifying peaks in a mass spectrum;
deconvolving a masses of the identified peaks,
identifying clusters of deconvolved masses that have contiguous charge states;
calculating a Bayesian fitness measure for each cluster of the identified clusters; and
performing an iterative decremental procedure to perform charge state deconvolution.

11. The method of claim 10, identifying clusters of deconvolved masses that have contiguous charge states includes applying a sliding window to the deconvolved masses of the identified peaks to identify the clusters of deconvolved masses with contiguous charge states.

12. The method of claim 10, performing the iterative decremental procedure includes iteratively subtracting a fraction of intensities of the cluster with the highest Bayesian fitness measure from the deconvolved masses of the identified peaks.

13. The method of claim 10, wherein the steps of calculating a Bayesian fitness measure and performing an iterative decremental procedure are repeated using a cluster with a next highest Bayesian fitness until a largest peak in a subtracted spectra is below a threshold.

14. The method of claim 10, wherein the steps of calculating a Bayesian fitness measure and performing an iterative decremental procedure are repeated using a cluster with a next highest Bayesian fitness until an average intensity in a subtracted spectra is below a threshold.

15. One or more non-transitory computer readable media having instructions thereon that, when executed by one or more processing devices of a charge state deconvolution apparatus, cause the charge state deconvolution apparatus to perform the method of claim 10.

\* \* \* \* \*